United States Patent [19]

Takami et al.

[11] 4,145,609

[45] Mar. 20, 1979

[54] SCINTILLATOR FOR A GAMMA RAY CAMERA

[75] Inventors: Katsumi Takami, Tokyo; Ken Ueda, Hachioji; Fumio Kawaguchi, Kokubunji; Teruichi Tomura, Kunitachi; Kenji Ishimatsu, Abiko, all of Japan

[73] Assignee: Hitachi Medical Corporation, Japan

[21] Appl. No.: 744,157

[22] Filed: Nov. 22, 1976

[30] Foreign Application Priority Data

Nov. 28, 1975 [JP] Japan .............................. 50-141635

[51] Int. Cl.$^2$ .............................................. G01T 1/20
[52] U.S. Cl. ............................... 250/361 R; 250/367; 250/368

[58] Field of Search ...................... 250/361, 368, 367

[56] References Cited

U.S. PATENT DOCUMENTS

| 2,695,964 | 11/1954 | Schepker | 250/368 |
| 3,102,955 | 9/1963 | Carlson | 250/368 |
| 3,207,899 | 9/1965 | Leishman | 250/368 |

*Primary Examiner*—Alfred E. Smith
*Assistant Examiner*—Janice A. Howell
*Attorney, Agent, or Firm*—Craig & Antonelli

[57] ABSTRACT

A scintillator for a gamma ray camera constituted by a crystal of NaI (Tl) having a surface roughness of less than 400 grit and a thickness of less than approximately 9 mm.

6 Claims, 9 Drawing Figures

| ROUGHNESS OF POLISH | THICKNESS | RESOLUTION (mm) | | |
|---|---|---|---|---|
| | | 9mm | 5mm | 12.7mm |
| | #800 | 2.8 | 2.6 | 3.0 |
| | #400 | 2.2 | 2.0 | 2.8 |
| | #220 | 2.0 | 1.8 | 2.8 |

SCINTILLATOR FOR A GAMMA RAY CAMERA

BACKGROUND OF THE INVENTION

1. Field of the Invention

The present invention relates to a scintillator for a gamma ray camera and, more particularly, to a scintillator for a gamma ray camera having a scintillating crystal of a specific surface roughness and a specific thickness.

2. Description of the Prior Art

Generally speaking, in Anger type gamma ray cameras, it is preferred that photomultipliers (hereinafter, referred to simply as "PM") spaced far from a luminescent point in a crystal receive as small an amount of light as possible. The reason resides in the fact that the resolution would be deteriorated due to excessive emphasis of statistically fluctuated photoelectrons since a large weighting function multiplies in formation relating to the position of those PMs although such information is small in quantity.

To explain in more detail, FIG. 1 shows a conventional scintillator for a gamma ray camera, the light from a luminescent point P being adapted to generate scintillation light upon receipt of a gamma ray is preferably received by PMi-1, PMi and by PMi+1 (i being an integer). In FIG. 1, reference numerals 1 and 2 designate an optical guide and a window of the scintillator. A scintillating crystal 3 preferably consists of, for example, NaI (Tl).

Accordingly, a line signal corresponding to a light spread function Fj(x) which would allow the light input only to those PMs adjacent to the luminescent point P but would not to the other PMs PMi-3 and PMi-2 is optimum. It will be understood that the resolution of the camera is improved by such a light spread function Fj(x) as would provide the above described light distribution.

A variety of methods have been adopted conventionally in order to improve the resolution, including a threshold-amplifier method in which the signals from PMs next to ones adjacent to the luminescent point or farther are neglected to remove the signals generated by fluctuated photoelectrons.

Alternatively, a so-called delay line method has been used in which weighting functions which multiply the information generated by statistically fluctuated photoelectrons are selected to be 0 (zero).

Another conventional method for improving the resolution is to increase the number N of total photoelectrons received by all PMs. This increase of the number N is possible by improving the quantum efficiency of PMs and optimizing photo-coupling or light guide between the PMs and the crystal. However, partly because the increase of N is limited and partly because the resolution is improved in proportion only to the square root of N, this method alone is insufficient to drastically improve the resolution.

SUMMARY OF THE INVENTION

The invention therefore seeks to provide a scintillator for a gamma ray camera in which the scintillating crystal has a specific surface roughness and a thickness thereby to improve the resolution and enhance the contrast by a method distinct from the above described conventional methods.

Experiments have been made by the present inventors to seek the conditions for obtaining an optimum light distribution function for a column signal, i.e.:

(i) the condition under which the gradient of light distribution at PM adjacent to the luminescent point reaches a maximum and the amount of light is reduced;

(ii) the condition for making the amount of light zero at PMs next to those adjacent to the luminescent point or farther; and (iii) the condition for increasing the number N of total photoelectrons.

In the experiments, the patterns of light distribution were measured for varying crystal thickness with a roughly polished crystal, during which an unknown interesting phenomenon was discovered as will be detailed hereinafter.

At first, the experiment focussed on increasing the number N through roughly polishing the crystal, employing an arrangement as shown in FIG. 2.

The thickness d of the crystal 1 and the surface roughness thereof were used as the parameters. The diameter of the PM and the thickness of a pyrex glass 2 were kept constant. A radiation source of $^{57}Co$ was used. The results of this test is shown in FIG. 3, in which the ordinate axis shows the heights of pulses, while the abscissa axis shows roughness.

It will be seen from FIG. 3 that the roughness of 800 grit in accordance with the Japanese Industrial Standards provides a much larger pulse height than a mirror-polished surface. This means that the number N is increased as the surface gets rougher, while N is inversely ralated to the resolving power.

For the roughness below 400 grit, no substantial increase of N was observed for a crystal with a thickness of 12.7 mm (½"), as indicated by a curve designated by o in FIG. 3. A thickness smaller than 9 mm provides a number N which increases drastically as the roughness gets rougher, as indicated by a curve designated by x. The reason for this interesting phenomenon will be described later. In FIG. 3, the curve designated by Δ shows the result of a test using a crystal having a thickness of 5 mm.

The phenomena in which the pulse height is substantially proportional to the roughness of the polish for roughnesses below 400 grit and in which this tendency is more remarkable for thinner crystals have been confirmed to be true for crystals thinner than 9mm, by various lots of crystals and various polishers. The increase of N has been found to be not so remarkable for those crystals having thicknesses between 9 and 12.7 mm.

Subsequently, in order to obtain an improved pattern of light distribution (light spread function), i.e. in order to seek the conditions of items (i) and (ii) as mentioned before, an experiment was made to observe the relationship between the position of the luminescent point and the pulse height, by laterally shifting the position of the gamma radiation source of FIG. 2. The results of the experiment are shown in FIG. 4A and FIG. 4B. In these Figures, the light spread functions are shown in normalized form for facilitating their evaluation. FIG. 4A shows relative values of pulse height for crystals with a thickness of 12.7 mm and having roughness of 800 grits (symbol o), 220 grits (symbol Δ) and 120 grits (symbol x) while FIG. 4B shows the result for a crystal with a thickness of 5 mm having roughnesses of 800 grits (symbol o) and 220 grits (symbol Δ).

In FIG. 4A, the curve has pointed peaks and a trailing skirt. The difference in roughnesses does not effect the peak of the curve but does slightly affect the skirt. In addition, the difference does not cause a substantial change in the gradient at position $(Xi+1)$ of the PM adjacent to the luminescent source.

In FIG. 4B, the curve resembles a trapezoid the skirt of which trails to a lesser extent. The shape of the peak varies as the roughness increases. The gradient at the point $Xi+1$ of the PM adjacent to the luminescent point drastically increases as the roughness increases. It is to be noted that the pulse height is zero at the position $Xi+2$. This tendency has commonly been observed for crystals having thicknesses below 9 mm.

The ordinate axis and the abscissa axis represent relative values of pulse height and distance (mm) from the luminescent point, respectively, in FIGS. 4A and 4B. Symbols $Xi$, $Xi+1$ and $Xi+2$ denote the centers of $PMi$, $PMi+1$ and $PMi+2$, respectively.

Thus, three requirements can conveniently be satisfied solely by making the crystal rougher, for crystals thinner than 9 mm, the requirements being to increase the number N, to increase the gradient and reduce the light at PM adjacent to the luminescent point and to reduce the light at PMs next to the ones adjacent to the luminescent point and farther.

However, there still remains a question whether this effect is actually derived from the rougher polishing or from the reduced total distance $d + d_o$ from the luminescent point to the PM. To clarify the reasons for the above advantageous phenomenon, a test has been made for crystals having thicknesses of 12.7 mm and 5.0 mm, in which the total distance $d + d_o$ was kept under constant at 18 mm by inserting suitable optical guides, the result of which is shown in FIG. 5. In FIG. 5, the axes are the same as those of FIG. 4, and curves designated by o and x correspond to the crystals of 12.7 mm and 5.0 mm thicknesses, respectively, polished by a polisher of 220 grits. It will be seen from FIG. 5 that the roughly polished crystal can provide an ideal trapezoidal shape of the light spread function curve $Fj(X)$, irrespective of the total distance from the luminescent point to the PM.

The invention is to provide a scintillator having a crystal thinner than 9 mm and having a surface roughness of below 400 grits, thereby to provide an ideal light spread or distribution for the PMs.

It is therefore an object of the invention to provide a scintillator for a gamma ray camera capable of improved resolution.

DETAILED DESCRIPTION

Figure 6:
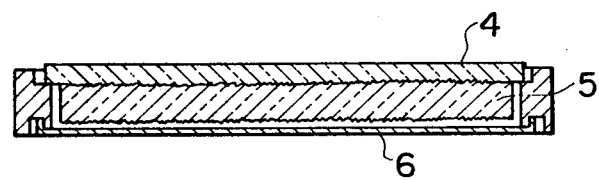
FIG. 6 is an illustration showing an arrangement of an embodiment of the present invention.

Referring to FIG. 6 showing an arrangement of a scintillator in accordance with the invention, a NaI crystal 5 having a thickness of 9 mm or less is used as a sintillation crystal. A window 4 is made of, for example, a pyrex glass. A complete diffusion reflector 6 is made of, for example, $Al_2O_3$, $MgO$, $BaSO_4$ or the like. The pyrex glass 4 and the crystal 5 are optically coupled to each other by means of an epoxy adhesive. The upper and the lower surfaces of the crystal 5 are roughly polished to between 400 and 120 grits. The complete diffusion reflector 6 is provided for reflecting back those lights into the crystal as are directed from the luminescent point to the lower side of the crystal.

A specific optical behavior in the crystal 5 will be described with reference to FIG. 7, through clarifying the reason why the roughly finished surface can provide a specific effect when the thickness of the crystal is below 9 mm.

Figures 7, 8:
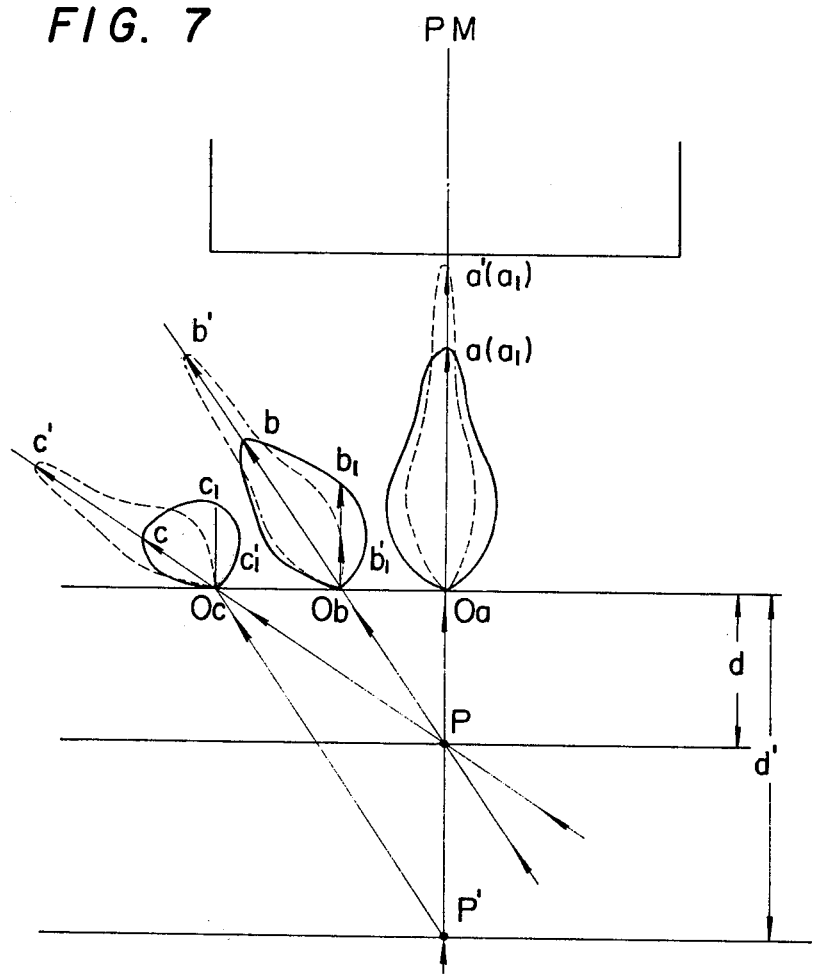
FIG. 7 is an illustration for explaining the light distribution as presented by the embodiment of FIG. 5.
FIG. 8 is a table showing resolution powers presented by the present invention.

Referring to FIG. 7, two mediums having a higher index n of refraction of 1.54 and a lower index n of refraction of 1.0 are roughly polished at their junction surfaces. A laser beam was applied to the mediums to exhibit light-emitting characters as shown in FIG. 7. In FIG. 7, the intensity of light (logarithmic representation) and the direction of light are given in polar coordinates, wherein points $Oa$, $Ob$ and $Oc$ are poles of the polar coordinate system. The direction of light represents the emitting angle of light which is the deflection of the polar coordinate.

For an easier understanding of the invention, it is assumed here that lights of the same intensity are applied to the points $Oa$, $Ob$ and $Oc$, although the intensities are not the same as will be described later.

For the rougher inter-surfaces, as shown by the full line curve, the component $O_c \rightarrow C$ in the direction of incidence at point $O_c$ is much reduced as compared with that of $O_b \rightarrow b$ at point $O_b$, since the diffusion gets larger as the angle of incidence gets larger, while the reduction of the component $O_c \rightarrow C_1$ at point $O_c$ compared with the component $O_b \rightarrow b_1$ at point $Ob$ in the direction toward the surface of PM is not so large. In a case where the surfaces are finely finished, as shown by broken line curve, this tendency is reversed, i.e. the decrease of the component in the incident angle is small and the decrease of the component directed to the surface of the PM is relatively large.

In thin crystals, since the distance d from the luminescent point P to the polished surface is relatively small, components of larger incident angle are dominant. At the same time, as the surface gets rougher, the curve of distribution of emitted light in FIG. 7 becomes rounder so as to increase those components of light directed toward the PM. More strictly, since the distance between the luminescent point P and each point differs from each other, the absolute value of the amount of light received by the points $Oa$, $Ob$ and $Oc$ must be calculated taking the square of the distance into account. However, the actual absolute values are not significant here to understand the merits of the small thickness and the rough surface of the crystal.

It will be understood from the foregoing description that in thin crystals the effect of rough polishing is more remarkable since the diffusion character largely depends on the incident angle of light and since the components of larger incident angle are dominative in the thin crystals. Thus, the crystal of 5 mm in thickness exhibits a larger effect due to roughing than the crystal of 9 mm in thickness.

Figure 4B:
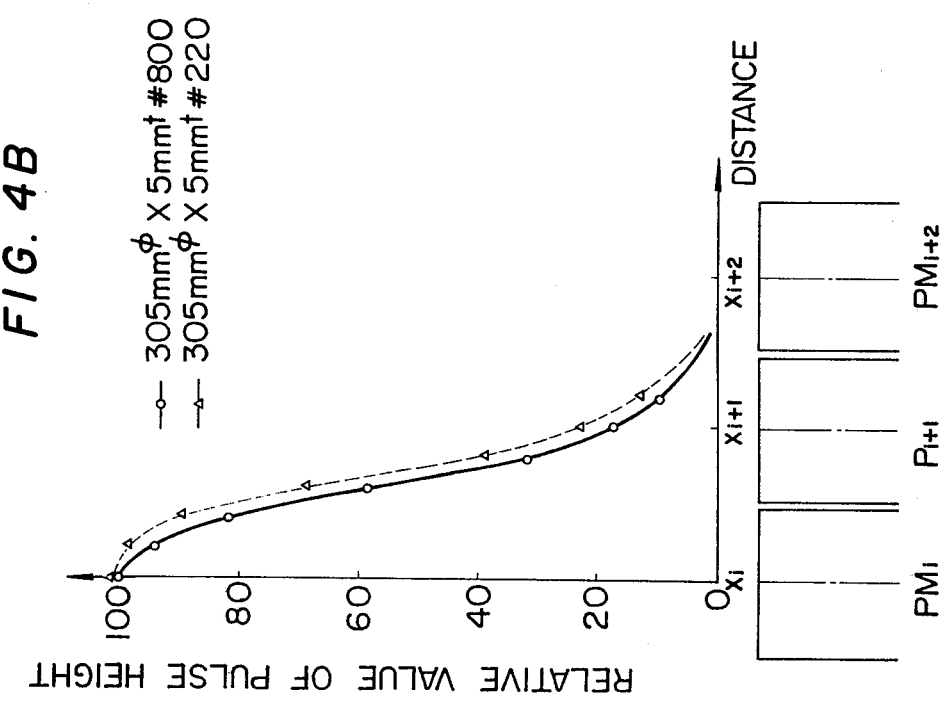
FIG. 4A and FIG. 4B are graphs showing relationships between the roughness of crystals and light distributions.

Turning again to FIG. 4B, the variation of the spreading pattern around the peak of the curve is considered to be attributable to a drastic increase of the light component directed to the PM due to the roughness of the crystal surface. At the same time, the steep and non-trailing skirt portion of the curves are attributable to the fact that the component $O_b \rightarrow b$ decreases much more from the component $O_a \rightarrow a$ than the component $O_c \rightarrow c$ does from the component $O_b \rightarrow b$ so that the component in the direction of the incident angle is reduced as the lateral distance increases.

In the case of a thick crystal, for the purpose of comparison, the distance d' from the luminescent point P' to the polished surfaces is relatively large to provide smaller angles of incident. Thus, the line P'Oc is considered to be parallel to the line POb. Therefore, the light directed from P' to Oc is diffused in a fashion similar to the lights $O_b \rightarrow b$ and $O_b \rightarrow b'$, providing vertical (i.e. directed toward the PM) components of $O_b \rightarrow b_1$ and $O_b \rightarrow b_1'$.

Figure 1:
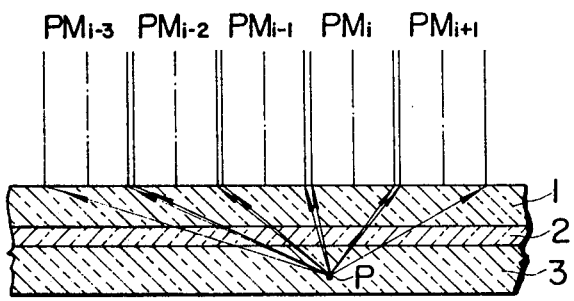
FIG. 1 is a schematic illustration of a conventional scintillator.
Figure 2:
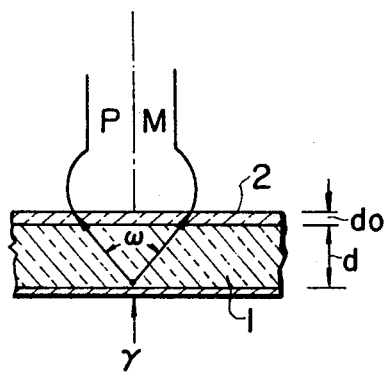
FIG. 2 is an illustration for explaining the experiment executed by the present inventors.
Figure 3:
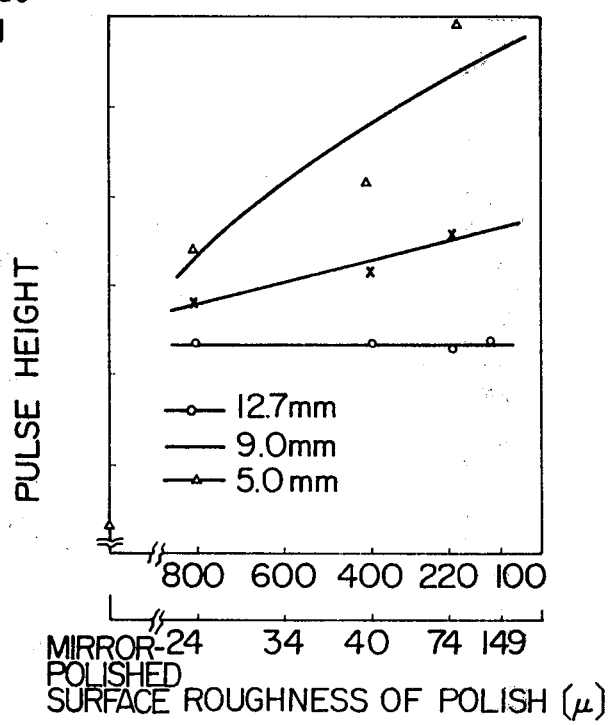
FIG. 3 is a graph showing relationships between pulse heights and roughnesses of crystals.
Figure 4A:
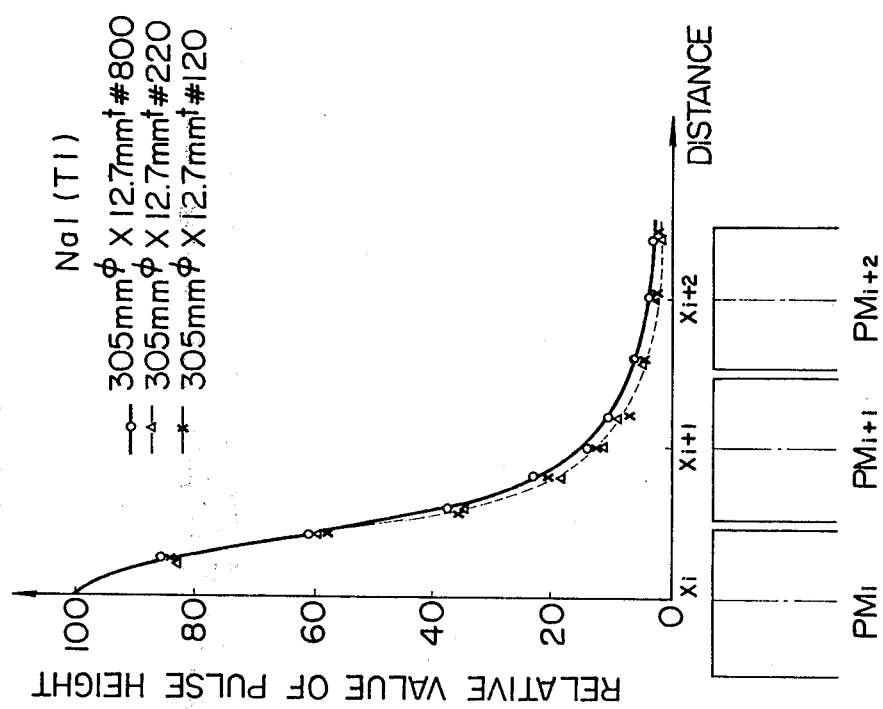
Figure 5:
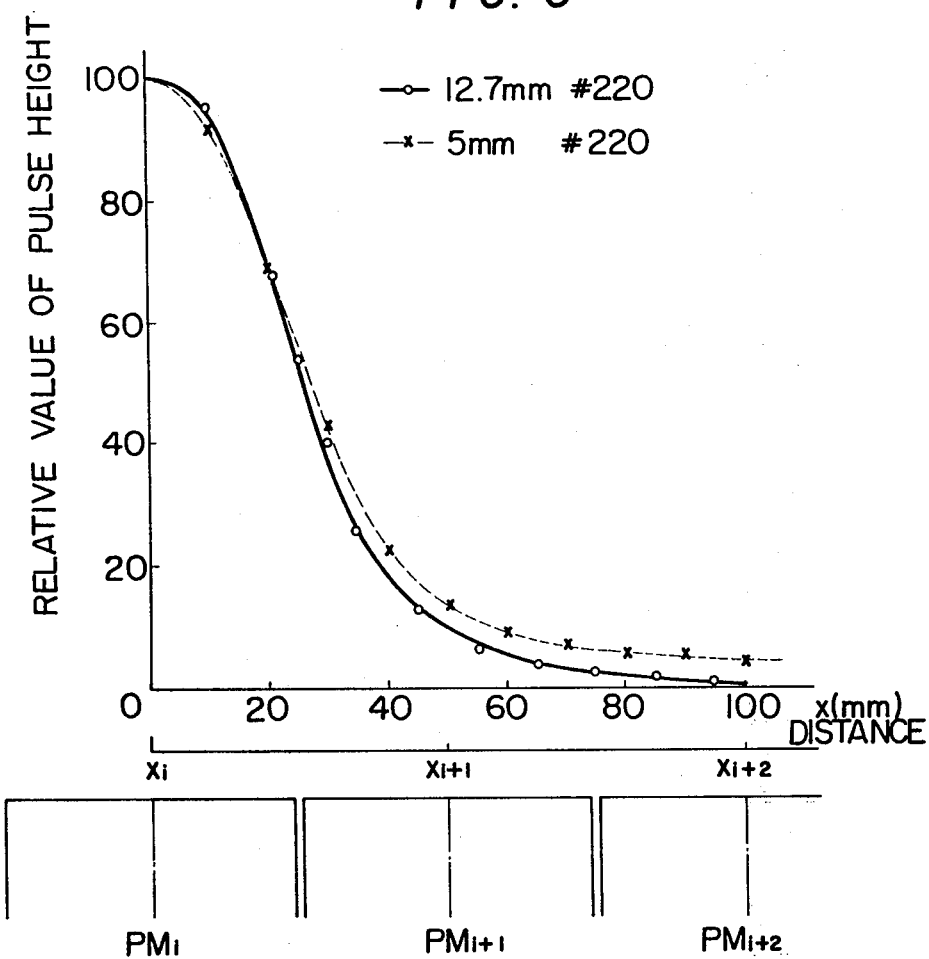
FIG. 5 is a graph for explaining the effect of rough polishing of crystals.

Consequently, in thick crystals, comparing a vertical incidence and an oblique incidence, a relation of $O_a \rightarrow a_1' >> O_b \rightarrow b_1'$ exists when the crystal is polished finely, while in the roughly finished crystals, relationships of $O_a \rightarrow a_1 > O_b \rightarrow b_1$ and $O_b \rightarrow b_1 > O_b \rightarrow b_1'$ are observed. Therefore, in thick crystals, the total amount of light received by the PM is almost constant irrespective of the roughness of the crystal surface since the integrated components of light directed to the PM are almost equal in both cases so that a property as shown in FIG. 3 is obtained regardless of the roughness. The trailing skirt portions of the curves of FIG. 4A are attributable to the fact that a smaller incident angle by a thick crystal causes a smaller reduction of components $O_b \rightarrow b$ in the direction of incidence.

Cameras equipped with scintillators in accordance with the invention showed resolution powers as summarized in the table of FIG. 8, when $^{57}Co$ was used as the radiation source.

As have been described, the merit of rough polishing is more remarkable for thinner crystals. However, there exists practical limits for the roughness and the thickness of the crystal. An extremely thin crystal inconveniently deteriorates the detection efficiency against gamma rays. Thus, for Tc (technetium), the thickness of the crystal is at least 1 to 3 mm.

At the same time, extremely rough polishing causes cracking of the crystal, as well as generation and omnipresence of bubbles at the juncture surface of the pyrex glass and the crystal. In addition, when the crystal is formed of combined domain regions having different axes, different diffusion of light would be caused by the domains to provide a false sensitivity distribution.

The roughness is therefore preferably 120 grits or less.

What is claimed is:

1. In a scintillator for Anger type camera apparatus having a scintillating crystal structure for producing light rays; and means for directing said light rays toward a photomultiplier; the improvement comprising said scintillating crystal having a thickness of 9 mm or less and upper and lower surfaces being roughly polished.

2. A scintillator as claimed in claim 1, wherein said upper and lower surfaces are polished to a roughness of 400 to 120 grits.

3. In a scintillation camera including a plurality of photomultipliers, an improved scintillator of the type having a scintillation crystal with a surface disposed in facing relationship to said photomultipliers, wherein the improvement comprises means for providing a predetermined trapezoidal light distribution function curve for each luminescent point in said crystal relative to one of said photomultipliers directly facing said luminescent point, such that improved resolution of said camera is achieved, wherein said means include said crystal having a thickness no greater than 9mm, and at least the surface of said crystal facing said photomultipliers is roughly polished.

4. An improved scintillator according to claim 3 wherein said surface is polished to a roughness of 400 grits and below, and wherein the surface of said crystal opposite to said photomultipliers is also roughly polished to the same extent, and said surfaces have a maximum surface roughness of 120 grits.

5. An improved scintillator according to claim 3, wherein the surface of said crystal opposite to said photomultipliers is also roughly polished.

6. An improved scintillator according to claim 3, further comprising means for optically guiding light from said luminescent point to said photomultipliers, wherein said means is interposed between said photomultipliers and said surface of said crystal.

* * * * *